United States Patent
Sa et al.

(10) Patent No.: US 7,522,234 B2
(45) Date of Patent: Apr. 21, 2009

(54) LIQUID CRYSTAL DISPLAY DEVICE AND METHOD OF FABRICATING THE SAME

(75) Inventors: Un Nyoung Sa, Gyeonggi-do (KR); Joung Won Woo, Gyeonggi-do (KR); Man Hoan Lee, Seoul (KR); Hyung Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 471 days.

(21) Appl. No.: 10/673,242

(22) Filed: Sep. 30, 2003

(65) Prior Publication Data

US 2004/0085493 A1    May 6, 2004

(30) Foreign Application Priority Data

Oct. 31, 2002    (KR) .................. 10-2002-0066786

(51) Int. Cl.
   *G02F 1/136* (2006.01)
(52) U.S. Cl. ............... 349/96; 349/43; 349/97; 349/98
(58) Field of Classification Search ............ 349/96–98, 349/43, 106, 110
   See application file for complete search history.

(56) References Cited

U.S. PATENT DOCUMENTS

| | | | |
|---|---|---|---|
| 4,643,529 A * | 2/1987 | Hosonuma et al. .......... 359/492 |
| 6,124,907 A * | 9/2000 | Jones et al. .................. 349/96 |
| 6,259,505 B1 * | 7/2001 | Makino ....................... 349/153 |
| 6,359,672 B2 * | 3/2002 | Gu et al. ..................... 349/138 |
| 6,417,899 B1 * | 7/2002 | Jones et al. .................. 349/96 |
| 6,646,702 B1 * | 11/2003 | Motomura et al. .......... 349/122 |
| 6,686,980 B1 * | 2/2004 | Ichihashi .................... 349/96 |
| 2002/0113931 A1 * | 8/2002 | Park et al. .................. 349/141 |
| 2002/0163616 A1 * | 11/2002 | Jones et al. ................ 349/187 |
| 2002/0196382 A1 * | 12/2002 | Ishino ......................... 349/43 |
| 2003/0002154 A1 * | 1/2003 | Trapani et al. .............. 359/492 |
| 2003/0117549 A1 * | 6/2003 | Yi et al. ...................... 349/106 |
| 2004/0085496 A1 * | 5/2004 | Paukshto et al. ........... 349/106 |

FOREIGN PATENT DOCUMENTS

| | | |
|---|---|---|
| KR | 2000-0040379 | 7/2000 |
| KR | 2001-0019832 | 3/2001 |
| KR | 2002-008115 | 10/2002 |

* cited by examiner

*Primary Examiner*—David Nelms
*Assistant Examiner*—Thanh-Nhan P Nguyen
(74) *Attorney, Agent, or Firm*—Morgan Lewis & Bockius LLP (57) ABSTRACT

A liquid crystal display device includes a transparent insulating substrate, a gate line and a gate electrode on the transparent insulating substrate, a gate insulating film, an active layer, an ohmic contact layer, source and drain electrodes and a data line on the transparent insulating substrate, a passivation film formed on the transparent insulating substrate including the source and drain electrodes and the data line, a polarizing film formed on the passivation film, and a pixel electrode formed on at least the polarizing film.

7 Claims, 7 Drawing Sheets

LIQUID CRYSTAL DISPLAY DEVICE AND METHOD OF FABRICATING THE SAME

The present invention claims the benefit of Korean Patent Application No. 66786/2002 filed in Korea on Oct. 31, 2002, which is hereby incorporated by reference.

BACKGROUND OF THE INVENTION

1. Field of the Invention

The present invention relates to a display device and a method of fabricating a display device, and more particularly, to a liquid crystal display device and a method of fabricating a liquid crystal display device having a reduced profile.

2. Description of the Related Art

In general, a liquid crystal display (LCD) device includes a first substrate, a second substrate, and a liquid crystal material disposed between the first substrate and the second substrate. In addition, a backlight assembly is arranged at a lower portion of an LCD panel to irradiate light. One of the first and second substrates is a thin film transistor substrate (TFT substrate) and the other is a color filter substrate. The TFT substrate includes gate bus lines and data bus lines that are formed on an inner surface of the transparent substrate in a matrix configuration. Thin film transistors (TFTs) function as switching devices and are formed at intersections between the gate bus lines and the data bus lines, and pixel electrodes that electrically contact drain electrodes of the TFTs are formed in unit pixel regions provided by the gate bus lines and the data bus lines. The color filter substrate includes a transparent substrate, a black matrix (BM) formed on an inner surface of the transparent substrate, a color filter layer, and a common electrode.

Operation of the LCD device includes a driving circuit that supplies a voltage to the gate bus lines and the data bus lines of the LCD device. As the voltage is supplied to the gate bus lines, the TFTs disposed at the intersections between the gate lines and the data lines to which the voltage is supplied, are turned ON or OFF. Then, an electric field is induced to the liquid crystal material by a voltage supplied to the pixel electrode via the TFTs and a voltage supplied to the common electrode. Accordingly, orientation of liquid crystal molecules of the liquid crystal material is changed in unit pixel regions. As a result, transmission characteristics of the liquid crystal material is changed in predetermined ones of the unit pixel regions in which the orientation of the liquid crystal molecules is changed. Thus, a predetermined color is displayed through the color filter of the color filter substrate.

Figure 1:
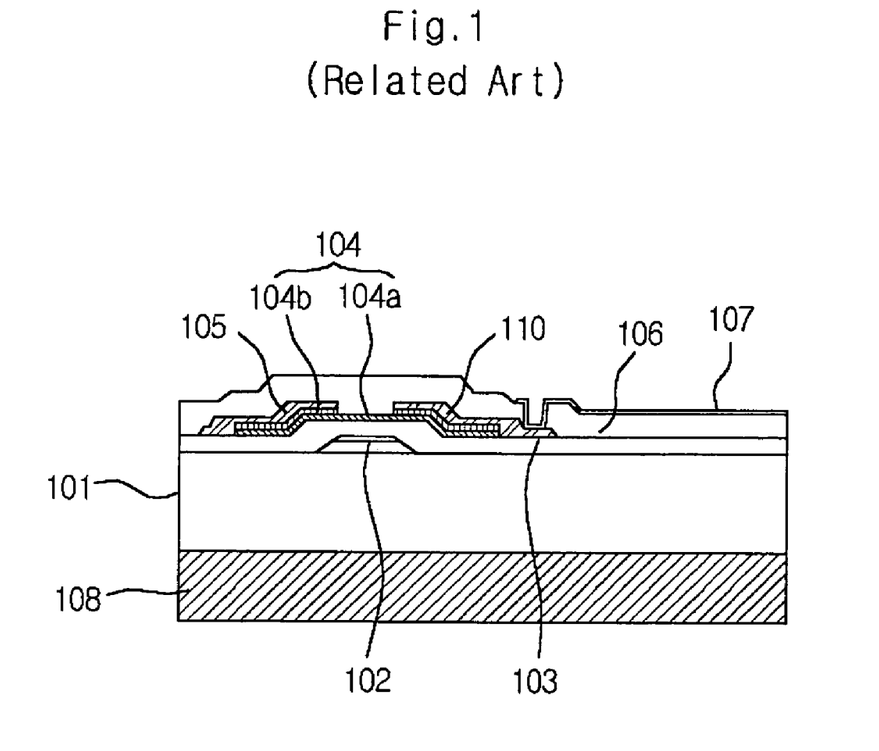
FIG. 1 is a cross sectional view of a TFT substrate according to the related art.

FIG. 1 is a cross sectional view of a TFT substrate according to the related art. In FIG. 1, a gate electrode 102 is formed on a transparent substrate 101, and a gate insulating film 103 is grown on the gate electrode 102 by a plasma enhanced chemical vapor deposition (PECVD). An amorphous silicon layer and a phosphorous-doped amorphous silicon layer are sequentially deposited and patterned using a photolithography process to form a channel layer 104 consisting of an active layer 104a and ohmic contact layers 104b. In addition, a polarizing plate 108 is positioned on the transparent substrate 101 to polarize ambient light and transmit only light that vibrates in a specific direction.

A metal layer is deposited on the substrate 101 including the channel layer 104, and then patterned by a photolithography process to form source and drain electrodes 105 and 110 that contact with the ohmic contact layers 104b. Then, a passivation film 106 of an inorganic film is formed on the substrate 101, and a pixel electrode 107 is formed on the passivation film 106. The pixel electrode 107 is formed of indium tin oxide (ITO).

Figure 2:
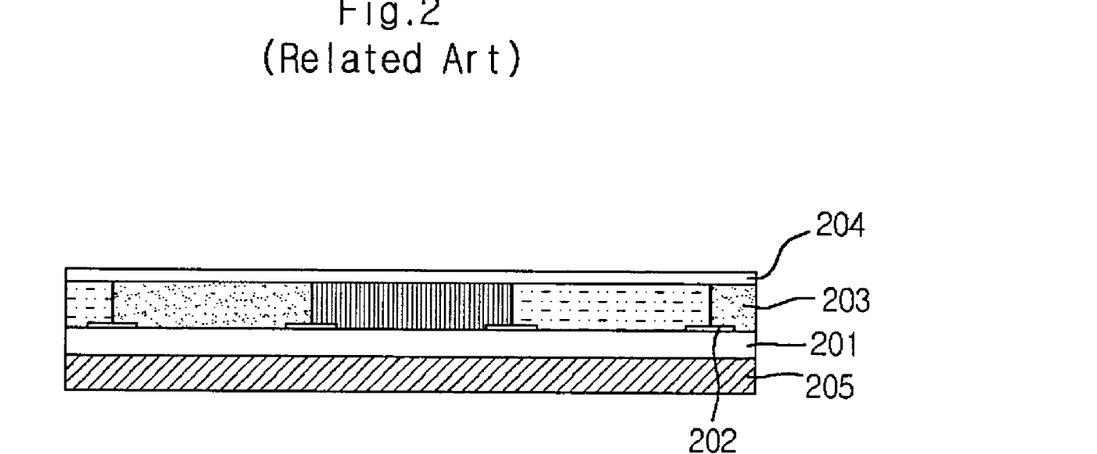
FIG. 2 is a cross sectional view of a color filter substrate according to the related art.

FIG. 2 is a cross sectional view of a color filter substrate according to the related art. In FIG. 2, the color filter layer of the color filter substrate is formed by a pigment dispersion method that includes coating a photoresist film containing carbon black and titanium oxide, which have light-shielding properties, on a transparent insulating substrate 201. Next, portions of the photoresist film are exposed to light using a mask to form a predetermined pattern. Then, the photoresist film is developed to remove the exposed portion of the photoresist film and remaining portions of the photoresist film that are patterned after the completion of the developing process are hardened to form the black matrix 202.

Then, a photoresist film of azo-based red pigment is coated on the substrate 201 upon which the black matrix 202 has been previously formed, and portions are exposed to light using a mask to form a predetermined pattern. Then, the photoresist film is developed to remove the exposed portion of the photoresist film and remaining portions of the photoresist film are hardened to form a red color filter. Using the same method as the formation of the red color filter, a green color filter and a blue color filter are sequentially formed on the substrate, thereby forming a color filter layer 203. Then, a transparent conductive film is deposited on an entire surface of the substrate 201 to form a common electrode 204. In addition, a polarizing plate 205 is positioned on the substrate 201 to polarize ambient light and transmit only light that vibrates in a specific direction.

The color filter substrate and the TFT substrate are bonded to each other with a gap therebetween maintained by spacers. Then, the liquid crystal material is injected into a space between the bonded substrates, thereby fabricating a liquid crystal module.

Figure 3:
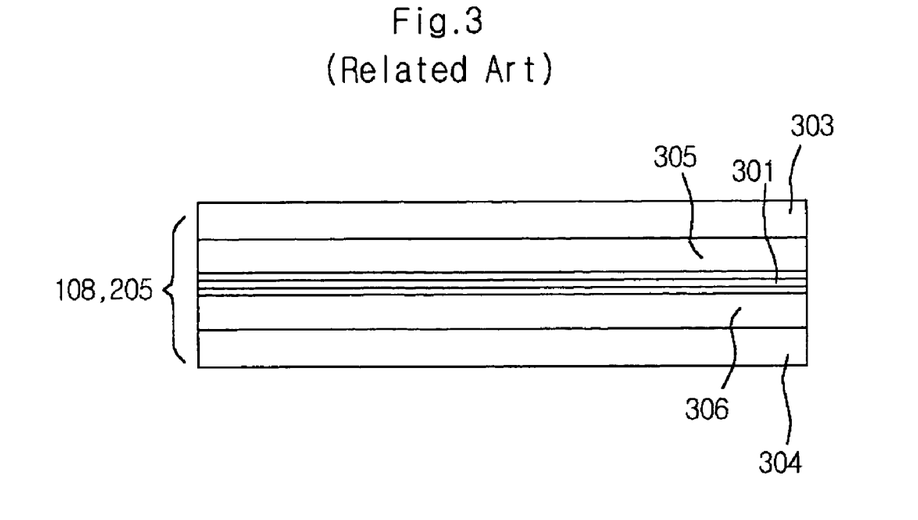
FIG. 3 is a cross sectional view of a polarizing plate according to the related art.

FIG. 3 is a cross sectional view of a polarizing plate according to the related art. In FIG. 3, the polarizing plates 108 and 205 of FIGS. 1 and 2, respectively, include a polarization film 301 made of polyvinyl alcohol. For example, a thin polyvinyl alcohol film is expanded while being heated, and then soaked in a solution called ink that contains a large amount of iodic acid. During the soaking process, the thin polyvinyl alcohol film absorbs the iodic acid to acquire a polarization function. Alternatively, in addition to the polyvinyl alcohol, polyvinyl-butyral film into which ionic acid is absorbed, or a uniaxially extended polyvinyl into which dichroic dye is absorbed can be used.

In order to protect the polarization-functional film 301, protective films 305 and 306 are further formed on upper and lower surfaces of the polarization-functional film 301. Furthermore, each of the polarizing plates 108 and 205 of FIGS. 1 and 2, respectively, includes an adhesive film 304 adhering to the glass substrate and a protective film 303 provided on the protective film 305, for preventing the generation of static electricity. However, foreign particles may be interposed between the polarizing plate 108 and 205 (in FIGS. 1 and 2, respectively) and the color filter substrate and/or TFT substrate when the polarizing plates are adhered to the outer surfaces of the TFT substrate and the color filter substrate. The foreign particles complicate the fabrication process since the polarizing plates must be separated from the respective substrate, cleaned, and reattached. Moreover, the polarizing plates adhered to the outer surfaces of the TFT and color filter substrates increase an overall thickness of the LCD device.

SUMMARY OF THE INVENTION

Accordingly, the present invention is directed to a liquid crystal display device and a method of fabricating a liquid crystal display device that substantially obviate one or more problems due to limitations and disadvantages of the related art.

An object of the present invention is to provide a liquid crystal display device and a method of fabricating a liquid crystal display device having a reduced profile.

Another object of the present invention is to provide a liquid crystal display device and a method of fabricating a liquid crystal display device having a simplified fabrication process.

Additional features and advantages of the invention will be set forth in the description which follows, and in part will be apparent from the description, or may be learned by practice of the invention. The objectives and other advantages of the inveniton will be realized and attained by the structure particularly pointed out in the written description and claims hereof as well as the appended drawings.

To achieve these and other advantages and in accordance with the purpose of the present invention, as embodied and broadly described, a liquid crystal display device includes a transparent insulating substrate, a gate line and a gate electrode on the transparent insulating substrate, a gate insulating film, an active layer, an ohmic contact layer, source and drain electrodes and a data line on the transparent insulating substrate, a passivation film formed on the transparent insulating substrate including the source and drain electrodes and the data line, a polarizing film formed on the passivation film, and a pixel electrode formed on at least the polarizing film.

In another aspect, a method of fabricating a liquid crystal display device includes forming a gate line and a gate electrode on a transparent insulating substrate, forming a gate insulating film, an active layer, an ohmic contact layer, source and drain electrodes and a data line on the transparent insulating substrate, forming a passivation film on the transparent insulating substrate including the source and drain electrodes and the gate line, forming a polarization film on at least the passivation film, and forming a pixel electrode on the polarizing film.

In another aspect, a liquid crystal display device includes a transparent insulating substrate, a black matrix formed on the transparent insulating substrate, a color filter layer formed on an upper surface of the black matrix, a polarizing film formed on the transparent insulating substrate, and a common electrode formed on the transparent insulating substrate.

In another aspect, a method of fabricating a liquid crystal display device includes forming a black matrix on a transparent insulating substrate, forming a color filter layer on the black matrix, forming a polarizing film on an upper surface of the color filter layer, and forming a common electrode on the transparent insulating substrate.

In another aspect, a liquid crystal display device includes a thin film transistor substrate, a color filter substrate, a liquid crystal material formed between the thin film transistor substrate and the color filter substrate, a pixel electrode formed on the thin film transistor substrate and a common electrode formed on the color filter substrate, the pixel electrode and the common pixel aligning orientation of liquid crystal molecules of the liquid crystal material, and a polarizing film contacting at least one of the pixel electrode and the common electrode for transmitting light vibrating in one direction.

In another aspect, a liquid crystal display device includes a first substrate including a plurality of pixel electrodes, a second substrate including a common electrode, a color filter film, and a black matrix, a liquid crystal material formed between the first and second substrates, an overcoat film on the color filter film and the black matrix, and a polarization film formed beneath the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the attached drawings.

Figure 4:
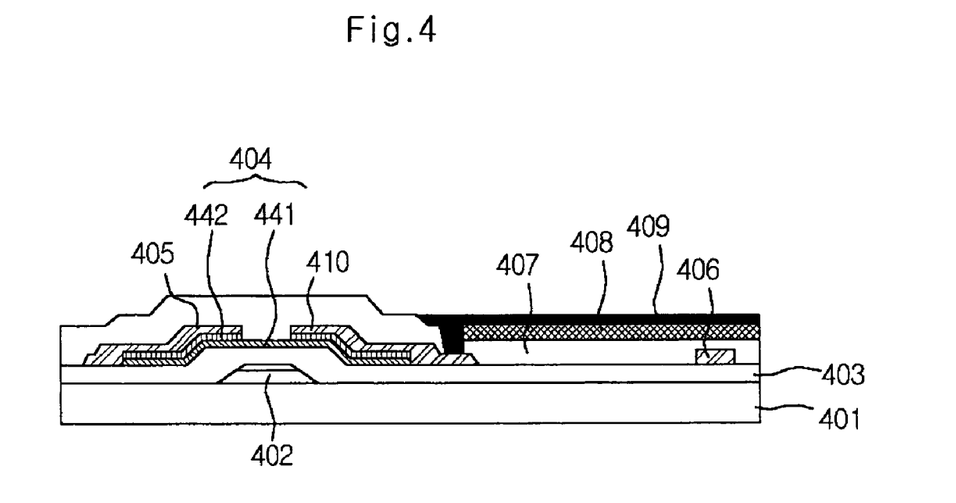
FIG. 4 is a cross sectional view of an exemplary TFT substrate according to the present invention.

FIG. 4 is a cross sectional view of an exemplary TFT substrate according to the present invention. In FIG. 4, a TFT substrate may include a transparent insulating substrate 401, a gate line (not shown) and a gate electrode 402 that may be formed by depositing a metal film on the transparent insulating film 401, a gate insulating film 403, an active layer 441, ohmic contact layers 442, source and drain electrodes 405 and 410, a data line 406, a passivation film 407, a polarizing film 408 formed on an upper surface of the passivation film 407, and an ITO pixel electrode 409 formed on the polarizing film 408. Accordingly, the LCD may allow light to be polarized through the polarizing film 408.

Figure 5:
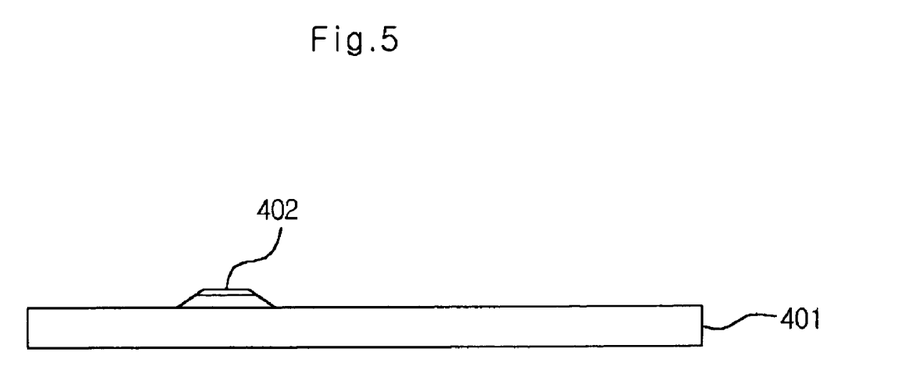
FIGS. 5 to 9 are cross sectional views of an exemplary method for fabricating a TFT substrate according to the present invention.

FIGS. 5 to 9 are cross sectional views of an exemplary method for fabricating a TFT substrate according to the present invention. In FIG. 5, a gate metal film may be deposited on a transparent insulating film 401 to form a gate line (not shown) and a gate electrode 402 that may extend from the gate line.

Figure 6:
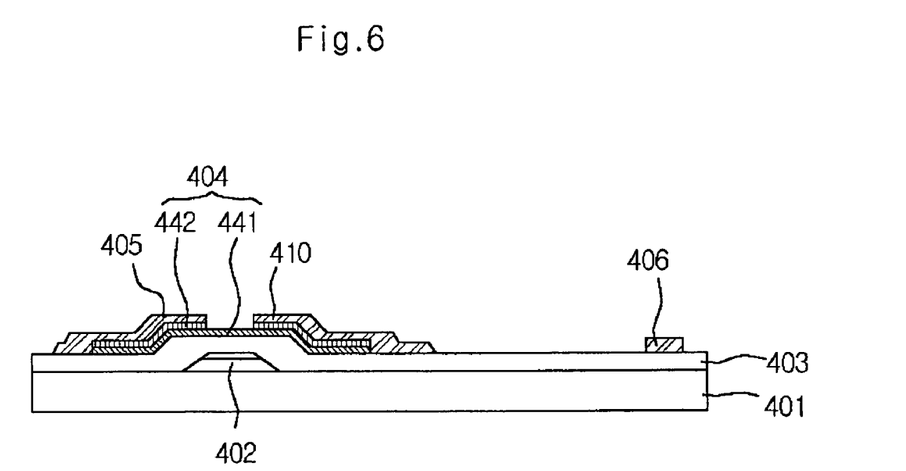

In FIG. 6, a gate insulating film 403, an active layer 441, ohmic contact layers 442, source and drain electrodes 405 and 410, and a data line 406 may be sequentially formed on the transparent insulating substrate 401 including the gate line and the gate electrode 402. The gate insulating film 403 may be deposited on the gate line and the gate electrode 402 by a plasma enhanced chemical vapor deposition (PECVD), and an amorphous silicon layer, and a phosphorous-doped amorphous silicon layer may be sequentially deposited on the gate insulating film 403. Then, the deposited amorphous silicon layer and phosphorous-doped amorphous silicon layer may be patterned using photolithographic processes to form the channel layer 404 of the active layer 441 between the ohmic contact layers 442. Accordingly, the active layer 441 may be formed of amorphous silicon and the ohmic contact layers 442 may be formed of phosphorous-doped amorphous silicon. Next, a metal film for source and drain electrodes may be formed on the transparent insulating substrate 401 including the channel layer 404 of the active layer 441 and the ohmic contact layers 442. Then, the metal film may be patterned by photolithographic processes to form the source and drain electrodes 405 and 410 and the data line 406.

Figure 7:
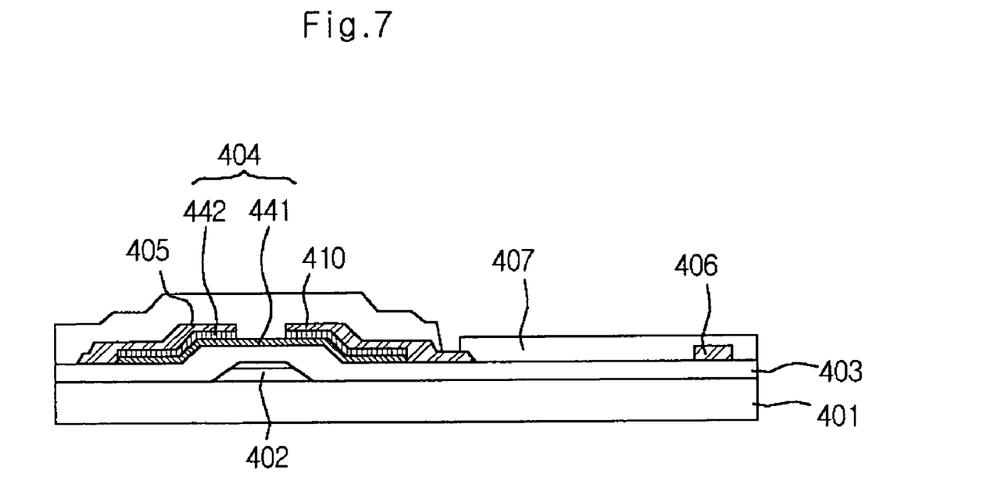

In FIG. 7, a passivation film 407 of an inorganic material may be deposited on an entire surface of the transparent insulating substrate 401 to protect a plurality of stacked devices. Then, a contact hole may be formed in the passivation film 407 to provide electrical contact between the drain electrode 410 and a subsequently formed pixel electrode formed at a pixel region. A process of forming the contact hole may include steps of coating a photoresist on the passivation film 407, forming a photoresist pattern by using photolithographic processes, etching the passivation film using the photoresist pattern as a mask, and removing the remaining photoresist pattern.

Figure 8:
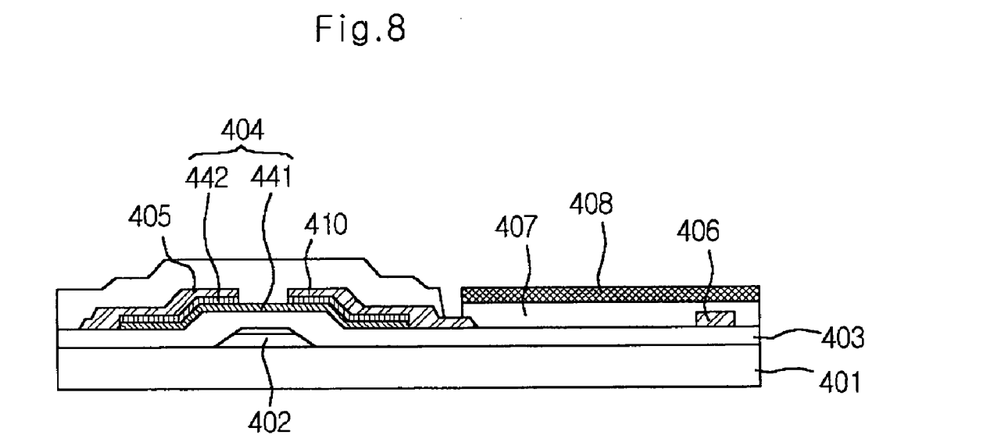

In FIG. 8, a polarizing film 408 may be formed on the passivation film 407 and may include polyvinyl alcohol. The polarizing film 408 may not be formed during the prior steps due to its chemical structure. Specifically, the processes before forming the polarizing film 408 may be performed at high temperatures of 230° C. to 320° C. for an extended period of time. Accordingly, polymers of the polarizing film 408 may be destroyed, thereby abruptly lowering light transmittance of the liquid crystal display device. Thus, the polarizing film 408 may be formed prior to the steps of forming the pixel electrode.

Figure 9:
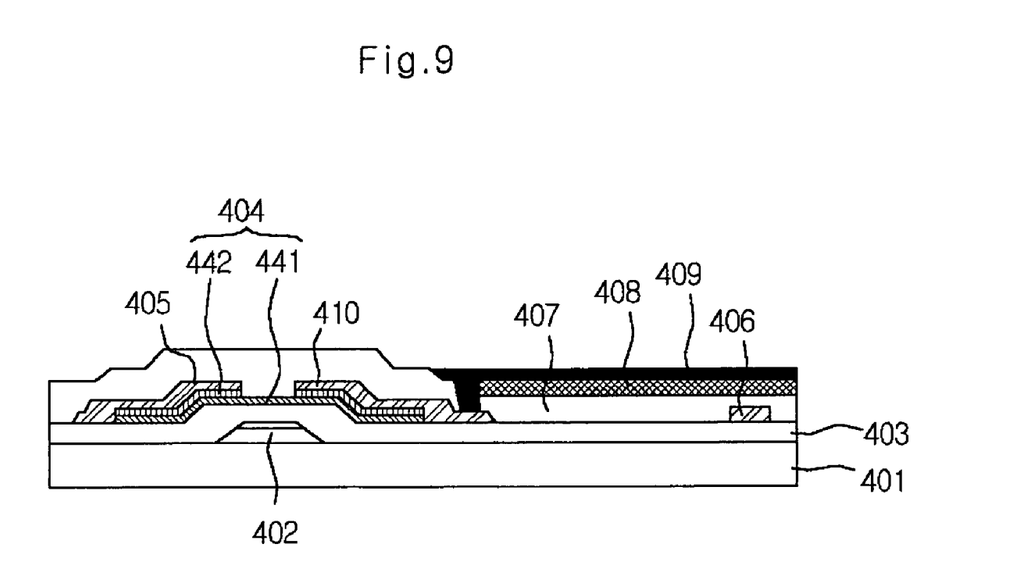

In FIG. 9, a step of forming the pixel electrode 409 on the polarizing film 408 may include deposition of indium tin oxide (ITO).

Figure 10:
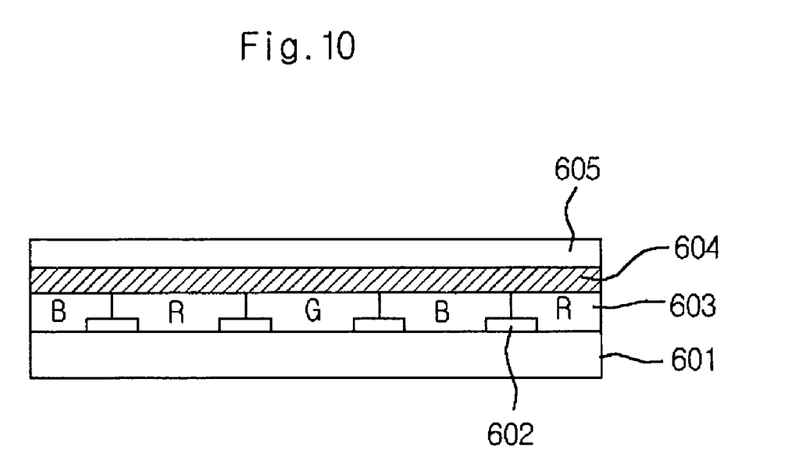
FIG. 10 is a cross sectional view of an exemplary color filter substrate according to the present invention.

FIG. 10 is a cross sectional view of an exemplary color filter substrate according to the present invention. In FIG. 10, a color filter substrate may include a transparent insulating substrate 601, a black matrix 602 formed by depositing a metal film of chromium (Cr) on the transparent insulating film 601, a color filter layer 603 formed by sequentially forming red, green, and blue color photoresist films on the black matrix 602 and exposing and developing the coated red, green, and blue photoresist films, a polarizing plate 604 formed on the transparent insulating substrate 601 upon which the color filter layer 603 may have previously formed, and a common electrode 605 formed by depositing a metal film of ITO on the transparent insulating substrate 601 upon which the polarizing film 604 may have been previously formed. The polarizing film 604 may be formed on an upper surface of the color filter layer 603. Accordingly, the polarizing film 604 passes only one-directional components of light.

Figure 11:
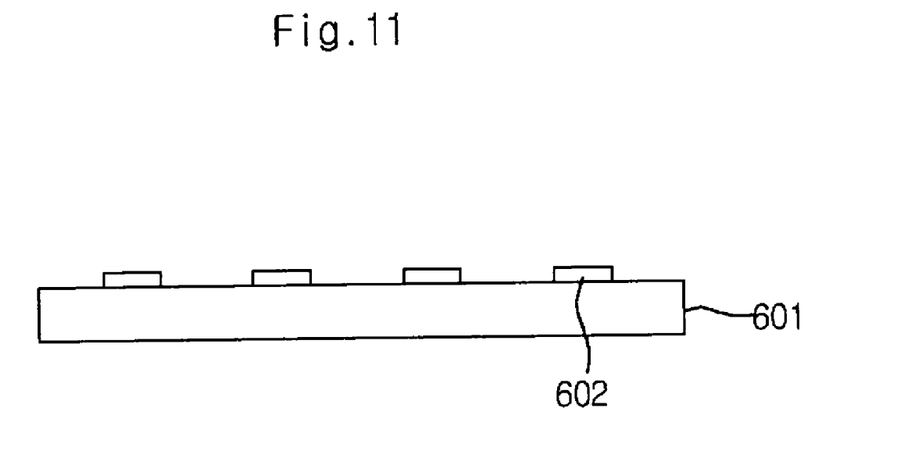
FIGS. 11 to 14 are cross sectional views of an exemplary method for fabricating a color filter substrate according to the present invention.

FIGS. 11 to 14 are cross sectional views of an exemplary method for fabricating a color filter substrate according to the present invention. The color filter layer may be formed by a dyeing method, a dye dispersion method, a pigment dispersion method, and an electrodeposition method. A description about the pigment dispersion method will be made exemplarily. In FIG. 11, a black matrix 602 may be formed by depositing a metal film of chromium on a transparent insulating substrate 601. In another method, a photoresist film containing carbon black and titanium oxide, which have light-shielding properties, may be coated on the transparent insulating substrate 601. Portions of the photoresist film may be exposed to light using a mask to form a predetermined pattern. Then, the photoresist film may be developed to remove the exposed portion of the photoresist film, and the remaining portions of the photoresist film pattern may be hardened to form the black matrix 602.

Figure 12:
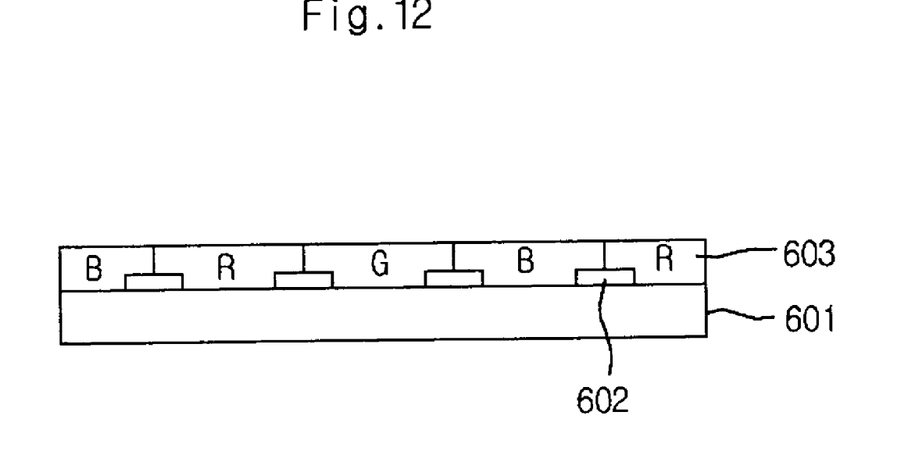

In FIG. 12, a red photoresist film may be coated on the black matrix 602, and exposed and developed to form a red color filter layer. For example, a photoresist film of azo-based red pigment may be coated on the transparent insulating substrate 601 upon which the black matrix (BM) 602 may have been previously formed. Then, portions of the photoresist film may be exposed to light using a mask so as to form a predetermined pattern. Then, the photoresist film may be developed to remove the exposed portions of the photoresist film, and the remaining portions of the photoresist film may be hardened to form a red color filter layer. Using the same method as the formation of the red color filter, a green color filter layer and a blue color filter layer may be sequentially formed on the transparent insulating substrate 601. In addition, the green color filter layer and the blue color filter layer may be formed from phthalocyanine-based green pigment and phthalocyanine-based blue pigment, respectively.

Figure 13:
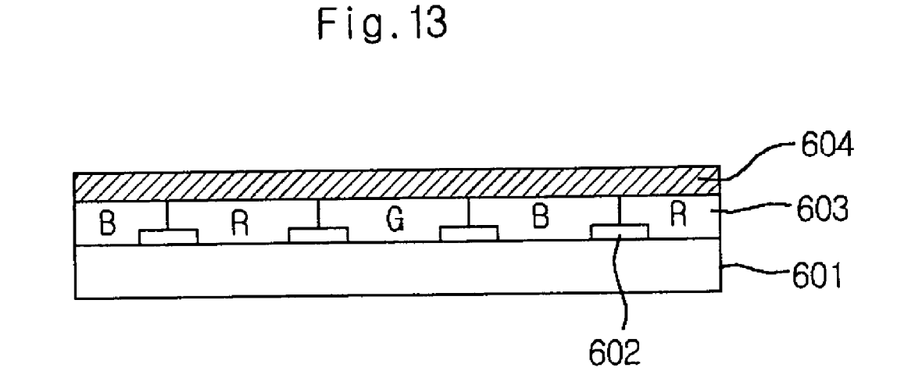

In FIG. 13, a polarizing film 604 may be formed on the transparent insulating substrate 601 upon which the red, green, and blue color filter layers 603 may have been previously formed. The polarizing film 604 may include polyvinyl alcohol. However, the polarizing film 604 may not be formed during the previous steps due to its chemical structure. Specifically, the processes prior to forming the polarizing film 604 may be performed at high temperatures of 230° C. to 320° C. for an extended period of time. Accordingly, polymers of the polarizing film 604 may be degraded, thereby abruptly lowering light transmittance of the liquid crystal display device. Thus, the polarizing film 604 may be formed prior to steps of forming the common electrode 605.

Figure 14:
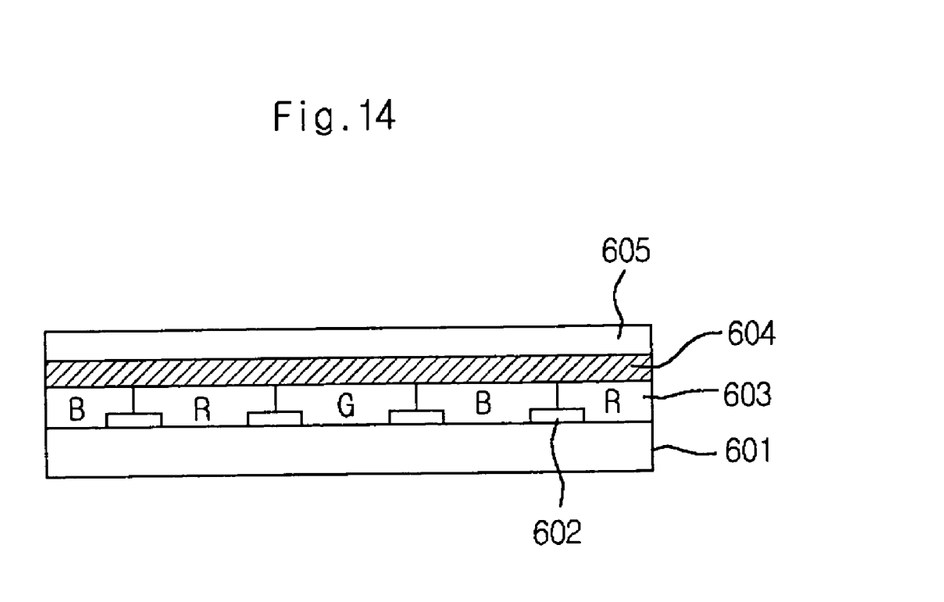

In FIG. 14, the common electrode 605 may be formed on the transparent insulating substrate 601 upon which the polarizing film 604 may have been previously formed. The common electrode 605 may be formed by depositing a ITO metal film, which is a transparent conductive film, on an entire surface of the transparent insulating substrate 601.

Figure 15:
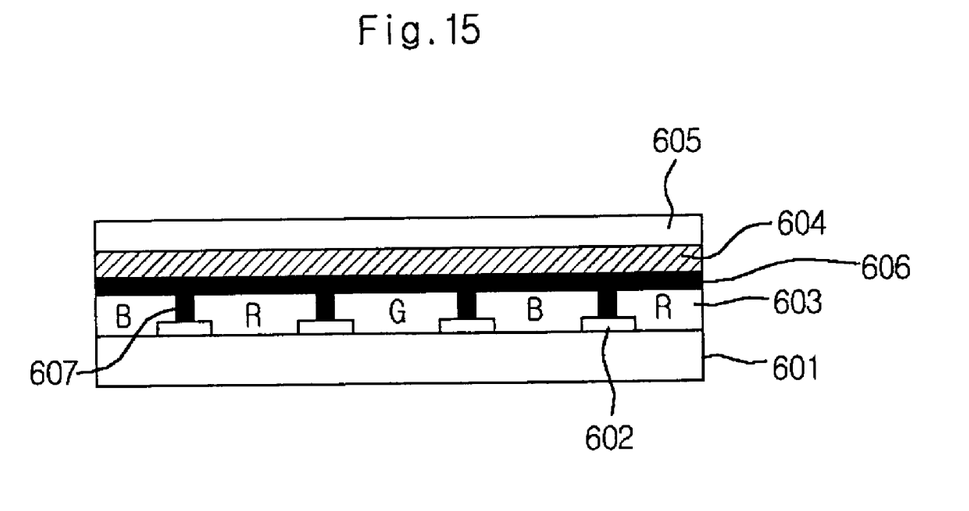
FIG. 15 is a cross sectional view of another exemplary color filter substrate according to the present invention.

FIG. 15 is a cross sectional view of another exemplary color filter substrate according to the present invention. In FIG. 15, a color filter substrate, as compared to the color filter substrate of FIG. 10, further includes an overcoat film 606 formed on the transparent insulating substrate 601 upon which the red, green, and blue color filter layers 603 have been previously formed. The overcoat film 606 is used to planarize a stepped portion 607 that may be formed during formation of the color filter layer 603 on the black matrix 602. However, the stepped portion 607 may not always be formed and the step of forming the overcoat film 606 may be omitted if planarization is not necessary. In addition, adhesion between the color filter layer 603 and the polarizing plate 604 may be enhanced since the color filter layer 603 is planarized by forming the overcoat film 606.

It will be apparent to those skilled in the art that various modification and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a transparent insulating substrate;
a gate line and a gate electrode on the transparent insulating substrate;
a gate insulating film, an active layer, an ohmic contact layer, source and drain electrodes and a data line on the transparent insulating substrate, the source and drain electrodes disposed at opposing sides of the active layer;
a passivation film formed on the transparent insulating substrate including the source and drain electrodes and the data line;
a polarizing film formed on the passivation film; and
a pixel electrode formed on at least the polarizing film,
wherein the polarizing film and the pixel electrode extend completely over the data line, and the polarizing film contacts the passivation film.

2. The device according to claim 1, wherein the pixel electrode includes ITO.

3. A method of fabricating a liquid crystal display device, comprising:
forming a gate line and a gate electrode on a transparent insulating substrate;
forming a gate insulating film, an active layer, an ohmic contact layer, source and drain electrodes and a data line on the transparent insulating substrate, the source and drain electrodes disposed at opposing sides of the active layer;
forming a passivation film on the transparent insulating substrate including the source and drain electrodes and the gate line;
forming a polarization film on at least the passivation film; and
forming a pixel electrode on the polarizing film,
wherein the polarizing film and the pixel electrode extend completely over the data line, and the polarizing film contacts the passivation film.

4. The method according to claim 3, wherein the pixel electrode includes ITO.

5. A liquid crystal display device, comprising:
a thin film transistor substrate;
a color filter substrate having a black matrix;
a liquid crystal material formed between the thin film transistor substrate and the color filter substrate;
a pixel electrode formed on the thin film transistor substrate and a common electrode formed on the color filter substrate, the pixel electrode and the common electrode aligning orientation of liquid crystal molecules of the liquid crystal material; and
a polarizing film contacting the pixel electrode for transmitting light vibrating in one direction,
wherein the polarizing film contacts a passivation layer on the thin film transistor substrate.

6. The device according to claim 5, wherein the polarizing film includes polyvinyl alcohol.

7. The device according to claim 5, further comprising an overcoat film formed beneath the polarizing film, wherein the polarizing film contacts the common electrode.

* * * * *